H. SÜSSMANN & M. MAYER.
INVERTED HIGH POWER GAS LAMP.
APPLICATION FILED NOV. 26, 1909.
1,067,560.
Patented July 15, 1913.
3 SHEETS—SHEET 1.
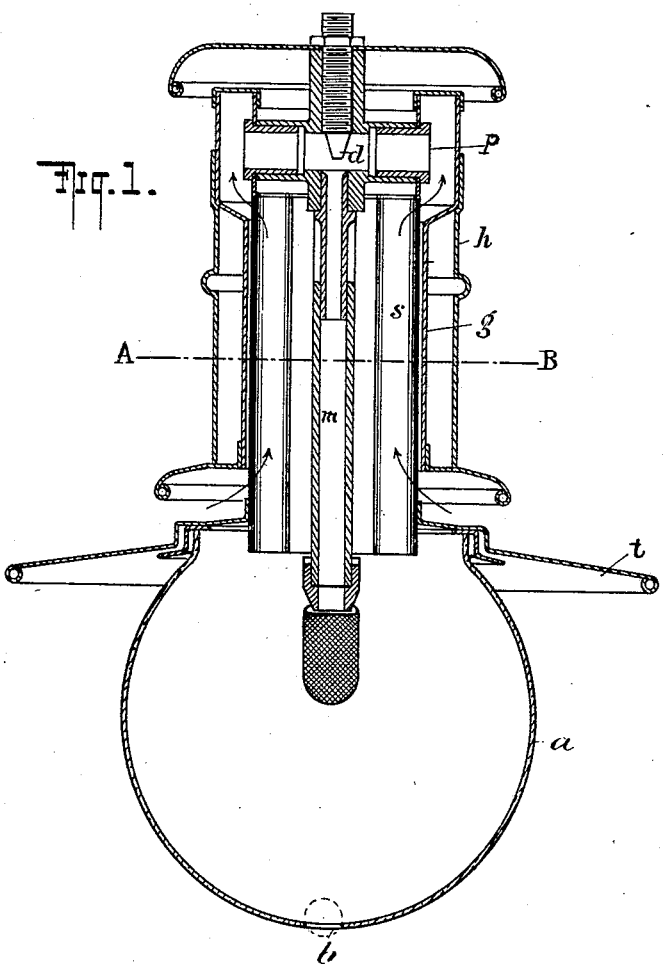
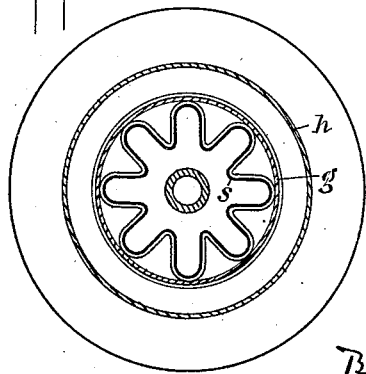
WITNESSES:
INVENTORS
HEINRICH SÜSSMANN
MAX MAYER
BY
ATTORNEYS H. SÜSSMANN & M. MAYER.
INVERTED HIGH POWER GAS LAMP.
APPLICATION FILED NOV. 26, 1909.
1,067,560.
Patented July 15, 1913.
3 SHEETS—SHEET 2.
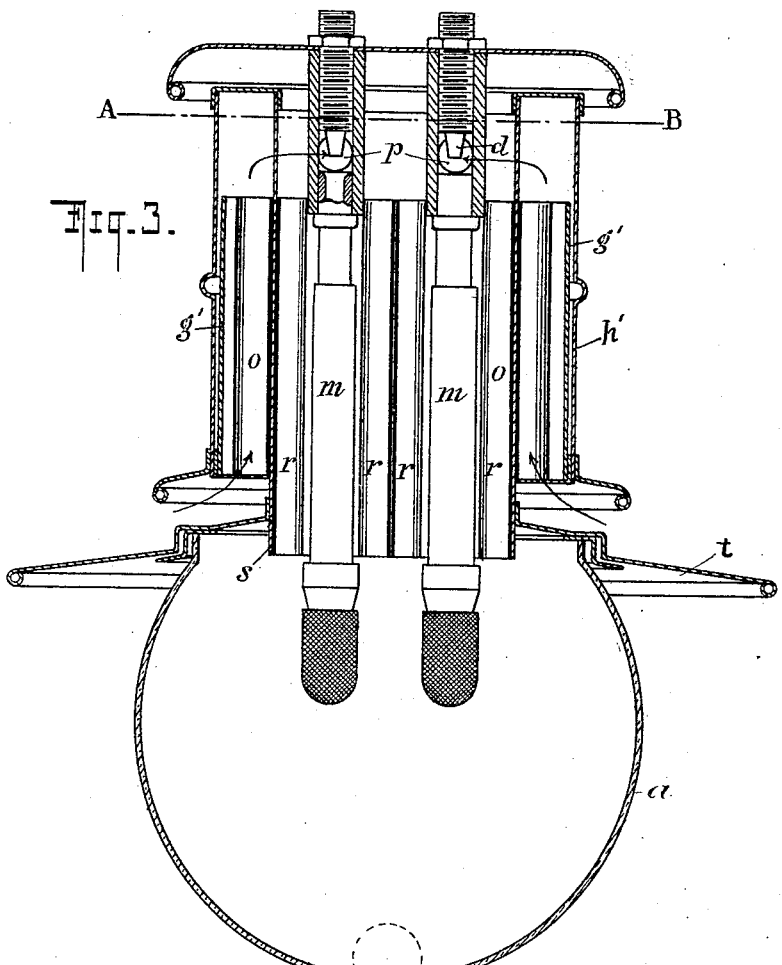
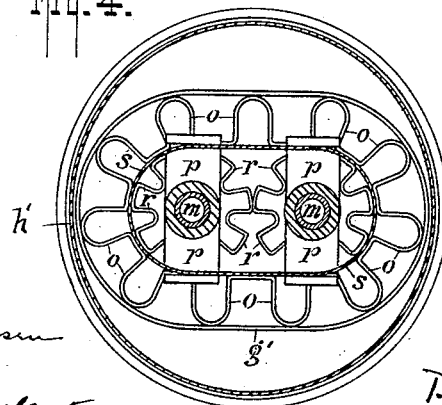
WITNESSES:
INVENTORS
HEINRICH SÜSSMANN
MAX MAYER
BY
ATTORNEYS H. SÜSSMANN & M. MAYER.
INVERTED HIGH POWER GAS LAMP.
APPLICATION FILED NOV. 26, 1909.
1,067,560.
Patented July 15, 1913.
3 SHEETS—SHEET 3.
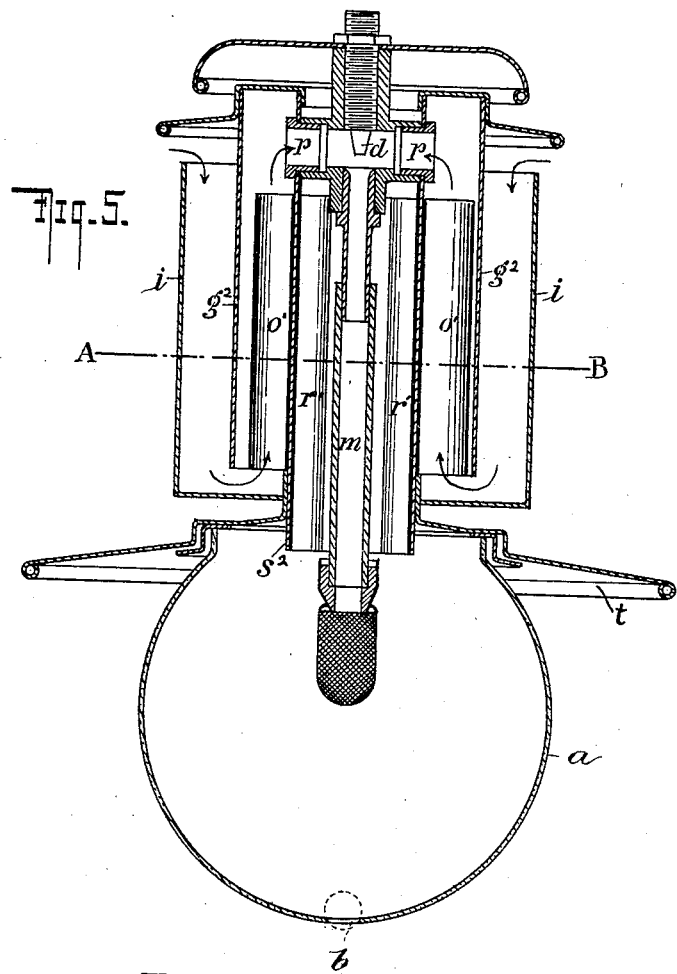
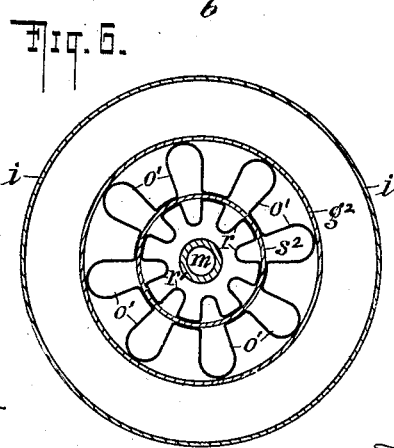
WITNESSES:
INVENTORS
HEINRICH SÜSSMANN
MAX MAYER
BY
ATTORNEYS

UNITED STATES PATENT OFFICE.

HEINRICH SÜSSMANN AND MAX MAYER, OF BERLIN, GERMANY, ASSIGNORS TO THE FIRM OF DEUTSCHE GASGLÜHLICHT AKTIENGESELLSCHAFT, OF BERLIN, GERMANY.

INVERTED HIGH-POWER GAS-LAMP.

1,067,560.  Specification of Letters Patent.  Patented July 15, 1913.

Application filed November 26, 1909. Serial No. 530,032.

*To all whom it may concern:*

Be it known that we, HEINRICH SÜSSMANN and MAX MAYER, both subjects of the Emperor of Germany, and residents of Berlin, Germany, have jointly invented certain new and useful Improvements in Inverted High-Power Gas-Lamps, of which the following is a specification.

In some constructions of inverted high power incandescent gas lamps worked by compressed gas or compressed air the primary or secondary air has been preheated by means of escaping combustion gases. In doing this the secondary air generally is conducted to the flame above the frame of the globe.

This invention relates to an inverted high power incandescent gas lamp for gas fed thereto under pressure, either by increasing the pressure of the gas itself or by means of compressed air in which secondary air is substantially absent, the entering of secondary air above the frame of the globe is avoided and the primary air is preheated up to the highest possible temperature on the outside of the chimney. For this purpose the combustion chamber is separated from the outer air above the frame of the globe and the dimensions of the chimney in each particular instance are such as to allow only for the passing therethrough of the combustion gases, without, however, producing any appreciable suction effect. By this arrangement we obtain the highest possible temperature of the flame and a maximum of lighting power without any tendency on the part of the lamp to produce a sound such as is observed with all former high pressure gas lamps.

In the annexed drawings we have shown several examples of the invention.

Figures 1 and 2 are respectively a vertical and a horizontal section through a one-burner lamp embodying our improvements; Figs. 3 and 4 are respectively a vertical and a horizontal section through a two-light lamp; and Figs. 5 and 6 are respectively a vertical and a horizontal section through a one-light lamp in which, as distinguished from Figs. 1 and 2, the path of the primary air is lengthened so as to better preheat such air.

The combustion chamber of the lamp shown in Figs. 1 and 2 is separated from the outer air at the bottom and on the sides by means of the globe $a$ and toward the top by means of the reflector $t$, so that the lamp in operation does not allow any secondary air to reach the flame and the chimney $s$ only serves for the escape of the combustion gases and is so proportioned as to allow the said combustion gases to escape substantially without producing any suction. There is therefore no tendency to draw secondary air into the lamp through any openings or apertures which may exist therein. The primary air rises on the outside of the chimney $s$ between the latter and the sleeve $g$ as shown by the arrows, is highly preheated during its passage along the sides of the chimneys and enters into the mixing pipe $p$ where it mingles with the gas escaping from the nipple $d$, the mixture then passing to the burner through the burner tube $m$ arranged within the chimney $s$. The sides of the chimney $s$ are corrugated so as to secure a maximum heating effect. A casing $h$ forms an inclosed body of stagnant air around the sleeve $g$.

Figs. 3 and 4 show a two-light lamp in which the outlet chimney $s'$ is formed oval, in order to render the section proportionate to the gas consumption and to provide for the escape of the combustion products substantially without suction as described above. The chimney $s'$ is provided with the inside ribs $r$ and the outside ribs $o$ to increase the heating surface. The primary air rises along the ribs $o$ and is conducted through the tubes $p$ to the gas escaping from the nipples $d$. The combustion chamber is closed laterally by the globe $a$ and on the top by the reflector $t$. The globe may be provided at the bottom with a small hole $b$ which offers an escape to any products of condensation and allows the lamp to be lighted from below without touching it. It is advisable to cover this hole while the lamp is burning, with a small ball which is placed in the globe as shown in dotted lines in the drawings, although this is not absolutely necessary as, even if left open, this hole will have but little influence on the light efficiency of the lamp. The sleeve $g'$ may be surrounded by a casing $h'$ to create between them a space with stagnant air so as to reduce radiation.

Figs. 5 and 6 show a one-light lamp differing from the one represented in Figs. 1 and 2 by the use of a chimney $s^2$ with inside ribs $r'$ and outside ribs $o'$ and also by the fact that the primary air is caused to travel through a longer path, being admitted at the top of a casing $i$ which surrounds the sleeve $g^2$ the air first passing down within the casing $i$ and then up within the sleeve $g^2$ to reach the gas nipple $d$.

The construction may be variously changed in its details, without departing from the principle of the invention. For instance, the form of the outlet chimney may be altered. The invention is further not restricted to any particular number of lights, and the lamp may be provided with one, two or more burners. In order to increase the heating of the primary air and to reduce as far as possible the radiation to the outside, the outside casing may be provided with a heat insulating material on the inside or outside or both, or the casing itself may consist of such material.

We desire to emphasize the fact that in our lamp the gas is not highly heated before it is mixed with air, since the gas tube in each case leads direct to the nipple $d$ placed near the top of the lamp, so that only a very short portion of the gas tube is exposed to the heat of the combustion gases. Our reason for avoiding high heating of the gas alone is that such procedure would result in a decomposition of the gas and a deposition of carbon, which would clog up the tube and nipple. A mixture of gas and air may however be highly heated without danger of the gas being decomposed, and even if free carbon should be formed momentarily, this will at once be oxidized to a gaseous state by the oxygen of the air. Another important feature of our invention is the heating of only the primary air, by causing it to pass along the outer wall of the chimney, and the practical absence of secondary air, in any event, the upper edge of the globe $a$ is tightly sealed, so that no secondary air can enter there, and if any secondary air is supplied at all, such air will come through the small opening $b$ at the bottom of the globe and will have practically no influence on the operation of the lamp.

In all the forms of our improved lamp a maximum amount of air is mixed with the gas before said gas reaches the flame thus providing a lamp of very high efficiency. As the mixture of gas and air above referred to is highly explosive it is necessary in order to overcome the tendency to explode and consequent back fire or flare back, to have the mixture of gas and air enter the Bunsen burner at high speed or under pressure. This result may be obtained by increasing the pressure of the gas above the usual pressure in the gas pipes leading to the nipples, so that the gas will leave said nipples at a high speed or it may be effected by having the gas supplied at the usual pressure and forcing a stream of air through the gas pipes and nipples along with said gas. In either case the necessary pressure may be obtained by means of any suitable mechanism connected with the usual gas pipes so as to supply the gas to the burner tube at high speed.

We claim as our invention:

An inverted high pressure gas lamp comprising a chimney for the escape of the combustion products, a globe attached at the bottom end of the chimney and closed for substantially preventing the entrance of secondary air, a burner tube extending downwardly within the chimney, a relatively large head closely surrounding said burner tube at the nozzle thereof, an incandescent mantle the upper edge of which closely embraces the said head for forcing the combustion products of the flame to go through the incandescent mantle, the casing surrounding the chimney and spaced therefrom to form a chamber adjacent to the chimney provided with air openings at the bottom edge of said casing, channels at the upper end of said casing adapted for communication with the burner tube whereby the supply of primary air is caused to travel along the outside of the chimney and to be admixed in a highly heated condition with the gas at the upper end of the burner.

Dated the 1st day of November, 1909.

HEINRICH SÜSSMANN.
MAX MAYER.

Witnesses:
HENRY HASPER,
WOLDEMAR HAUPT.

Copies of this patent may be obtained for five cents each, by addressing the "Commissioner of Patents, Washington, D. C."